3,208,984
ORGANOSOLIDS
Henri G. G. Dekking, Fullerton, Calif., assignor to Union Oil Company of California, Los Angeles, Calif., a corporation of California
No Drawing. Filed Nov. 5, 1962, Ser. No. 235,513
12 Claims. (Cl. 260—89.5)

This invention relates to materials comprising solids or extenders which are bonded through a basic nitrogen radical to an organic polymer and to compositions of organic matrices containing such materials.

This invention also relates to a method for propagating an organic polymer chain from the surface of a solid.

The materials of my invention can be used as fillers, extenders or gelling agents for a variety of organic matrices such as cast and molded plastics, paints, greases, drilling fluids, natural and synthetic fibers, textiles, paper, etc. Heretofore, various mineral fillers such as alumina, silica, clays, etc., have been used in such matrices; however, they are difficult to incorporate into the matrix and often degrade the matrix properties.

It has been suggested that organic polymers (polycations) be synthesized to have recurring reactive groups e.g., amine groups, along their chains for bonding to mineral surfaces. An example of such a polymer is a styrene-vinylpyridine copolymer. The resultant adduct of an ion-exchange solid and the ammonium salt of the copolymer is a highly crosslinked material and, as a result, many desired properties; e.g., swelling of expanding lattice clays; are greatly impaired. The polymer chain is bound to the ion exchange solid along its length and is not spacially free, thereby losing many of its resin properties. Finally, the incorporation of many reactive groups (amine radicals) in the polymer chain renders the polymer very hydrophilic.

It is an object of my invention to provide materials comprising ion exchange solids which are bonded to organic polymers wherein the properties of the solids and the polymers are not impaired by their combination.

It is an object of my invention to provide a method for propagating an organic polymer chain from the surface of an ion exchange surface.

It is also an object of my invention to treat and fill various organic matrices with my solid-polymer materials.

Other and related objects will be apparent from the following description of my invention.

I have found that organic polymers can be propagated from the surface of various ion exchange solids by adducting an organic azo compound having at least one basic nitrogen radical with the ion exchange solid to form a free radical precursor. The precursor, in a manner characteristic of organic azo compounds, will undergo homolytic fission to cleave the azo nitrogen to carbon bonds symmetrically, liberate nitrogen and form organic fragments which have a terminal carbon with an unshared electron in its valence shell, i.e., free radicals. At least half; and in some instances all; the free radicals so generated from the precursors of my invention are bonded to an ion exchange solid through a basic nitrogen group. The free radicals so generated readily combine with unsaturated compounds to initiate polymerization and thereby propagate a polymer chain from the surface of the ion exchange solid.

The macromolecules prepared in accordance with my invention comprise an ion exchange solid which is bonded through basic nitrogen groups to polymer chains, each polymer chain being attached to the solid through only a single terminal basic nitrogen group. In contrast to the aforementioned copolymerization of vinyl amines with other monomers, the basic nature of the polymer is not altered by inclusion of a plurality of amino groups. Additionally, crosslinking or bonding between separate ion exchange particles or crosslinking of adjacent platelets of solid do not occur and, therefore, the swelling properties of expanding lattice clays are not impaired by the presence of the polymer.

In general, any solid which undergoes an ion exchange type of reaction to form an adduct with basic nitrogen organic compounds can be used to form the free radical precursor of my invention. Generally, solids possessing an ion exchange capacity of at least about 0.1 milliequivalent per 100 grams of the solid are desired; preferably, solids having ion exchange capacities of at least about 1 milliequivalent per 100 grams are used. This group of solids includes various well known synthetic organic ion exchange solids such as the sulfonated polystyrene resins, sulfonated phenol formaldehyde resins, etc. Preferably, however, inorganic ion exchange solids are employed to impart solvent resistance, high temperature strength, hardness, etc., to vinyl polymers hereafter described.

Various inorganic solids possess the property of strongly adsorbing organic ammonium ions by apparent chemical bonding through a base exchange reaction. These solids are commonly referred to as ion-exchange solids and include the oxides and hydroxides of alkaline earth metals, iron, aluminum, silicon, vanadium, as well as the synthetic and naturally occurring alumino-silicates, e.g., clays, zeolites, molecular sieves, etc.

The alumino-silicates are a preferred group of ionorganic solids and include such zeolitic materials such as chabazite, analcite, gmelinite, faujasite, etc. Synthetic zeolites, which are obtained by heating the proper proportions of alumina and silica with an excess of sodium hydroxide and thereafter washing out excess caustic, can be employed. The crystalline products so obtained are available commercially as the various "Molecular Sieves" 4A, 5A, 13A, 13X, 10X, etc.

Preferred alumino-silicates are the naturally occurring clays which are available having a wide variety of chemical and physical properties. For the purposes of my invention, the clays can be classified into non-swelling types and swelling or expanding lattice types.

The non-swelling types include illite having a three-layer non-expanding lattice; kaolinite, nacrite, dickite, anauxite, halloysite, endellite, etc., having a two-layer crystal; allophane, an amorphous solid; chlorite, mica, brucite, etc., having mixed layers; and attapulgite, sepiolite, polygorskite, having a chain-like or fibrous structure. In general, these clays have a low ion exchange capacity; between about 0.1 and about 50 milliequivalents per 100 grams.

The expanding lattice clays include montmorillonite, sucinite, vermiculite, nontronite, saponite, hectorite, etc., which have a three-layer crystal. These clays are commonly found in admixture in bentonite clays having an average aluminum oxide content less than about 20 percent. The bentonite clays also have a high ion exchange capacity, commonly between about 50 and 150 milliequivalents per 100 grams of air-dried clay. Swelling or expanding lattice clays are found in Wyoming, South Dakota, Montana, Utah, Nevada and California.

The aforedescribed clays and natural zeolites are usually found in a form wherein the ion exchange sites are occupied with alkali and/or alkaline earth metals. The commercially synthetic zeolites are also available with their exchange sites occupied by an alkali metal, e.g., sodium, lithium, potassium, etc.; alkaline earth metals, e.g., calcium, magnesium, etc. The clays and zeolites can be ion exchanged with a salt of the basic nitrogen organic azo compound to form my free radical precursor or can be treated to exchange the alkali or alkaline earth metals with hydrogen ions and the resultant hydrogen solid thereafter neutralized directly with the basic nitrogen organic azo compound.

Substitution of hydrogen for the alkali or alkaline earth metals in the naturally occurring clays and zeolites can be accomplished simply by acid washing the solid. In this method, known to those skilled in the art, the solid is treated with a dilute mineral acid such as hydrochloric, nitric, phosphoric, sulfuric, etc., and thereafter separated from the excess of the acid by settling filtration, etc.

The clay or zeolite can also be converted to the hydrogen form by passing a suspension of the solid over a hydrogen charged ion exchange column such as an Amberlite IR–120. The resultant hydrogen clay or zeolite can thereafter be reacted with the amine azo compound in a manner hereafter described.

As previously mentioned, the organic addent to the aforedescribed ion exchange solid comprises at least two functional groups; a basic nitrogen group for bonding to the ion exchange solid and an azo group to generate a free radical.

The onium or salt of the basic nitrogen in the organic azo compound can be prepared from the organic azo compound simply by addition of an acid, such as hydrochloric, acetic, phosphoric, nitric, sulfuric, etc., to a solution of the organic compound in a suitable solvent. In lieu of a dilute acid, alkyl halides, phosphates, nitrates or sulfates can be added to the amine such as methyl chloride, isopropyl bromide, triethyl phosphate, butyl nitrate, methyl sulfate, etc.

The free radical generating group is an azo group. In general, organic azo compounds of alkyl or aryl compounds are useful, and preferably, such compounds have the azo nitrogens bonded to carbons of alkyl or aryl groups with at least one and, most preferably, both of the carbon atoms vicinal to the azo nitrogen being secondary or tertiary. To form a bond to the ion exchange solid, it is also necessary that at least one and preferably both of the aliphatic or aryl groups contain a basic nitrogen or ammonium radical, i.e., that one or both of these groups contain a nitrogen which is basic, i.e., capable of accepting a proton.

Structurally, suitable organic azo compounds which can be quaternized and adducted with the ion exchange solids are as follows:

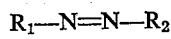

wherein

At least one and preferably both $R_1$ and $R_2$ contains a basic nitrogen group; and
$R_1$ and $R_2$ are selected from the class consisting of aryl, alkaryl, aminoaryl, amidinylaryl, aminoalkaryl, amidinylalkaryl, alkyl, amidinylalkyl, aminoalkyl, aralkyl, amidinylaralkyl, and aminoaralkyl.

As previously mentioned, the preferred compounds are those having secondary or tertiary carbons vicinal to the azo nitrogen.

Representative of this class of bifuntional azo compounds are the following:

Where $R_1$ is aryl or alkaryl and $R_2$ is aminoalkyl, amidinylalkyl, aminoaralkyl or amidinylaralkyl, phenylazomethylamine, phenylazopropylamine, 2-naphthylazomethylamine, p-tolylazobutyramidine, p-tolylazoisopropylamidine, p-tolylazopentylamidine, γ-(phenylazo)-β-aminocumene, γ-(tolylazo)-β-aminocumene, γ-(phenylazo)-p-aminotoluene, etc.

Where $R_1$ is aryl or alkaryl and $R_2$ is aminoaryl, amidinylaryl, aminoalkaryl, or amidinylalkaryl: 4-aminobenzene, 3-aminoazobenzene, N,N'-dimethyl-4-aminoazobenzene, 1-amino-2,2'-azonaphthalene, etc.

Where $R_1$ is alkyl or aralkyl and $R_2$ is aminoalkyl, amidinylalkyl, aminoaralkyl or amidinylaralkyl: aminodiazymethane, methylazobutyramidine, 2-methylazoisopropylamine, γ-ethylazo-β-aminocumene, γ-methylazophenethylamine, etc.

Where $R_1$ is alkyl or aralkyl and $R_2$ is aminoaryl, amidinylaryl, aminoalkaryl or amidinylalkaryl: p-aminophenylazomethane, o-aminoxylyazoisopropane, 6-amino 2-naphthylazoethane, 2-(p-aminophenyl)-1-phenylethane, etc.

Where $R_1$ and $R_2$ contain amino or amidinyl groups: 4,4'-diaminoazobenzene, 3,3'-dimethyl 4,4'-diaminoazobenzene, 6-(p-aminophenylazo)-2-naphthylamine, 2,2'-azobisisobutyramidine, γ,γ' - azobis(p - quanyltoluene), azobisisopropylamine, azobismethylamidine, etc.

As previously mentioned, the organic addent can be readily converted from a basic nitrogen radical to an onium group by various methods apparent to those skilled in the art. The organic addent can be dissolved in a suitable inert solvent such as benzene, chloroform, methyl ethyl ketone, dichlorobenzene, formamide, dimethyl formamide, acetone, hexane, trichloroethane, cyclohexane, isopropyl acetate, ethyl propionate, toluene, amyl bromide, xylene, n-butyl ether, etc., and a dilute acid thereafter added. Suitable acids are hydrochloric, acetic, phosphoric, sulfuric, nitric, etc. If desired, the onium group can be formed by addition of organic esters of mineral acids such as methyl sulfate, triethylphosphate, ethyl nitrate, etc. or alkyl halides such as methyl chloride, ethyl fluoride, etc.

By any of these methods the basic nitrogen group is converted to its highest positive valency which upon addition of water gives rise to organic cations. This is suitably accomplished by the addition of about 0.1 to 10 parts of water to each part of the organic solution. The solvent-water dispersion of organic cations is then added to a dispersion of the ion exchange solid, whereupon the free radical precursor of my invention is formed by conventional base exchange of the organic cations for the metal ions of the ion exchange solid.

In a preferred embodiment with a clay, the "as-received" clay is converted to its hydrogen form by a suitable treatment such as washing with an acid, e.g., hydrochloric, nitric, acetic, sulfuric, phosphoric, etc., and the resultant hydrogen clay is reacted directly with the basic nitrogen organic azo compound. As previously mentioned the hydrogen clay can also be obtained by contacting an aqueous suspension of the clay with a hydrogen charged ion exchange resin.

The adducted ion exchange solid settles out of the aqueous suspension and is readily recovered by filtration. The solid can be purified of unreacted organic addent by washing with a suitable solvent for the organic compound, e.g., any of the aforementioned solvents.

The resultant organosolid comprises the solid-organic free radical precursor, i.e., an azo group which is bonded to the ion exchange solid through the basic nitrogen group. Typical of such organosolids are: azobisisobutyramidinium montmorillonite; azobisisobutyramidinium kaoline; p-phenylazoanilinium halloysite; N,N'-dimethyl-p-phenylazoanilinium hectorite; 4-(3 aminophenyyazo)-3 - aminoanilinium attapulgite; 2 - (azobenzene)amylammonium montmorillonite; etc.

The organosolid materials so obtained are, in general, hydrophilic solids which can be filtered from the aqueous suspension used in their preparation, dried and powdered. At room temperatures, the solids are quite stable. Upon heating to slightly above room temperature, e.g., about 25° to about 125° C., however, the organic portion of the solid will decompose by homolytic fission of the azo nitrogen-carbon bonds to liberate nitrogen and form free radical fragments, i.e., fragments having a carbon to carbon chain with a terminal carbon having an unshared electron in its valence shell. At least half of such fragments will be bonded to the solid by the basic nitrogen or onium linkage. These free radicals can be used as initiators for polymerizations and other chain propagating reactions in the manner that purely organic free radicals are used. In accordance with the standard practice, the decomposition of the azo compound to yield free radicals will, in general, be performed in an aqueous or organic suspension of the organosolid free radical precursor together with the reactants which are to be initiated into a reaction by such free radicals.

The organosolid free radicals generated by my invention are highly immobile and can not readily recombine with each other. With most of the solids, i.e., the ion exchange and non-swelling type clays; however, approximately half of the free radicals formed are organic fragments which are sufficiently mobile to recombine with the organosolid free radicals. Accordingly, the decomposition of the free radical precursor and formation of the free radicals should be performed in a medium which contains the reactants to be initiated so this initiation occurs before the fragments recombine. Those skilled in the art will recognize this technique as typical of the usual method for using organic free radical initiators.

When an azo compound which has a basic nitrogen in the carbon chain on each side of the azo nitrogens is adducted with a swelling type clay, I have found that very stable immobile free radicals can be generated which can be stored for extended periods prior to use. While I do not wish to be bound by theory for this behavior, I believe that the dibasic azo compound base exchanges both onium groups onto ion exchange sites in the clay lattice so that upon decomposition, two organosolid free radicals are generated which can not recombine because of the rigidity of the clay lattice. The presence of free radicals can be detected in aqueous suspensions of the organosolid many hours after the complete decomposition of the azo compound, thus indicating that these radicals have, indeed, been stabilized by their base exchange to basal plane exchange sites of the clay.

I have further found that adduction with clay tends to increase the decomposition constant of typical azo compounds while the heat of activation remains of the same order of magnitude. The following are typical results for the decomposition constant and activation energy of an azo compound, 2,2'-azobisisobutyramidine hydrochloride (AIBA) and two organoclays prepared with this compound, 2,2'-azobisisobutyramidinium montmorillonite (AIBAM) and 2,2'-azobisisobutyramidinium kaolin (AIBAK):

| Azo Compound | Temperature, °C. | k x 10$^4$ (recip. sec.) | Activation Energy (kcal/mol) |
|---|---|---|---|
| AIBA | 60 | 0.37 | |
|  | 70 | 1.32 | |
|  | 75 | 2.58 | 30.8 |
|  | 80 | 5.13 | |
| AIBAM | 50 | 0.180 | |
|  | 55 | 0.397 | |
|  | 70 | 3.21 | 30.2 |
|  | 80 | 10.40 | |
| AIBAK | 50 | 0.137 | |
|  | 60 | 0.616 | |
|  | 70 | 2.28 | 32.1 |
|  | 80 | 9.52 | |

In general, vinyl compounds are readily polymerized upon initiation with a free radical, and these compounds are also readily polymerized with the free radicals of my invention. The polymerization conditions commonly used in the art can also be used for the polymerization of my invention, in general these are: temperatures between about 25° and about 200° C., preferably between about 50° to about 90° C.; pressures up to about 50 atmospheres, sufficient to maintain a liquid phase at the polymerization temperature; and times of 10 minutes to about 24 hours to complete the polymerization.

In general, the free radicals of my invention can be used in the homo- or copolymerization of the following monomers:

Hydrocarbon olefins and diolefins such as ethylene, propylene, butene-1, isobutylene, butadiene, pentene-1, isopentene, pentadiene, isoprene, hexene, isohexene, iso-heptene, heptadiene, octene, isooctene, nonene, decene styrene, methylstyrene, vinyl naphthalene, etc.;

Vinyl halides such as vinyl fluoride, vinyl chloride, vinylidene chloride, fluorotrichloroethylene, chlorostyrene, chloroprene, etc.;

Acrylics such as acrylic acid, methacrylic acid, acrylamide, methacrylamide, acrylonitrile, methacrylonitrile, methyl methacrylate, methyl acrylate, ethyl acrylate, ethyl methacrylate, propyl acrylate, iso-propyl methacrylate, iso-butyl acrylate, amyl methacrylate, hexyl methacrylate, lauryl methacrylate, stearyl methacrylate, etc.;

Vinyl ethers such as ethyl vinyl ether, iso-propyl vinyl ether, butyl vinyl ether, etc.;

Vinyl esters such as vinyl acetate, vinyl propionate, vinyl isobutyrate, vinyl benzoate, diallyl phthalate, divinyl terephthalate, vinyl naphthoate, etc.; and Miscellaneous vinyl compounds such as vinyl pyridine, vinyl carbazole, vinyl pyrrolidone, etc.

Any of the aforementioned monomers or mixtures thereof can be polymerized or copolymerized with the free radicals prepared in accordance with my invention using otherwise conventional techniques in the art. Thus, emulsion, bulk or solution polymerization can be employed.

The solid-organic free radicals are well suited to bulk homo- or copolymerization by the dispersion of between about 0.05 and about 500 parts by weight of the free radical precursor in 100 parts by weight of the monomer; preferably between about 0.2 and about 200 parts by weight per 100 parts of any of the aforementioned monomers is employed. The resultant dispersion is thereafter injected into the mold or suitable receptacle, heated to between about 25° and about 125° C. to decompose the azo radical and cause polymerization. The ion exchange solid advantageously serves as a heat sink for this polymerization, and prevents overheating of the polymer from the reaction exotherm.

Emulsion homo- or copolymerization of the aforementioned monomers can also be conducted with use of my free radical precursor. Examples of various monomers which can very readily be emulsion polymerized are butadiene, styrene, butadiene-styrene, vinyl acetate, vinyl chloride and acrylic esters such as methyl methacrylate, ethyl acrylate, lauryl methacrylate, acrylonitrile, etc. In general, the emulsion is formed by the addition to the reactants of about 0.1 to about 5.0 percent (based on amount of the monomer) of a non-ionic emulsifying agent, e.g., condensates of ethylene oxide with alkyl phenols, fatty acids, fatty alcohols, fatty amides which have hydrophobic groups containing between about 10 and about 24 carbons and between about 14 to 15 ethylene oxide units. Emulsions containing from about 5 to about 300 parts by weight of the monomer in 100 parts water can be used, preferably, the monomer is used in an amount between about 10 and about 200 parts per 100 parts water. The free radical precursor is used in amounts between about 0.05 and about 500 parts per 100 parts of monomer; preferably in amounts between about 0.2 and about 200 parts per 100 parts water.

Solution polymerization of the aforementioned monomers or copolymerization of mixtures of the monomers can also be conducted in various solvents such as benzene, cyclohexane, n-hexane, ethylbenzene, trichlorobenzene, formamide, dimethyl formamide, pentane, heptane, acetone, methanol, etc. The monomer or mixture of monomers is added to the solvent, generally in an amount between about 5 and about 300 parts per 100 parts of solvent, preferably between about 10 and about 200 parts per 100 parts. The free radical precursors of my invention can easily be dispersed in any of the aforementioned solvents in the necessary amounts; between about 0.05 and about 500 parts per 100 parts of monomer, preferably between about 0.2 and about 200 parts per 100 parts of monomer. Upon heating to the selected initiation temperature; between about 25° and about 80° C.;

the azo nitrogen-carbon bonds of the precursor of my invention are homolytically cleaved and free radicals are generated which react with the monomer to initiate the polymerization.

As previously mentioned, the free radicals generated from certain of the precursors of my invention are quite stable because they are bonded to ion exchange sites of expanding lattice clays. With these precursors, the preferred polymerization technique is to decompose the precursor in the absence of monomer, hold the resulting product for a short period—generally from two minutes to an hour—to permit the purely organic fragments to recombine and thereafter add the monomer or mixture of monomers. The recombination of most of the purely organic free radicals excludes the formation of any substantial amounts of polymer which is not attached to the clay lattice, so that from 70 to 100 percent of the polymer obtained is bonded by basic nitrogen groups to the clay. This preferred technique can be used directly in emulsion or solution polymerization by decomposing the free radical precursor in water or in any of the aforementioned solvents for the monomers. An aqueous emulsion of the monomer or, in solution polymerization, a solution of the monomer in a solvent is thereafter added to the free radical containing medium.

The following examples will illustrate my invention:

EXAMPLE 1

Azobisisobutyramidinium hydrochloride

Anhydrous hydrogen chloride gas was bubbled into a dispersion of 100 grams of 2,2'-azobisisobutyronitrile in 500 grams of absolute ethanol. The temperature was maintained at 5°–10° C. for 2½ hours and then the reactants were permitted to warm to room temperature. The clear solution containing 358 grams of reacted hydrogen chloride was cooled to 5° C. and maintained at that temperature overnight. A crystalline solid formed and this solid was separated, washed with cold ethanol and dried. The yield was 207 grams of 2,2'-azobisisobutyramido ethyl ester hydrochloride.

To a cold slurry of 200 grams of the imido ester in 120 grams of absolute ethanol, was added a cold solution of 60 grams of ammonia in ethanol. The mixture was warmed to 25° C. and thereafter maintained at room temperature for 16 hours. A crystalline product was formed which was filtered, washed and air dried at 25° C. The total weight of solid 2,2'-azobisisobutyramidine hydrochloride was 118 grams. The compound was water soluble and had the following analysis: carbon 36.8 percent, chlorine 26.4 percent and nitrogen 31.0 percent. These results corresponded to the calculated amounts for azobisisobutyramidine hydrochloride which are: carbon 35.4; chlorine 26.1; and nitrogen 30.9.

EXAMPLE 2

Aminoazobenzene

Aniline (14 grams) and concentrated hydrochloric acid (24 grams) are stirred into 75 milliliters of water and the mixture cooled to 0° C. by the addition of 50 grams of ice. Over a 10-minute period, 5.2 grams of sodium nitrite are added. After 30 minutes, 21 grams of sodium acetate are added and a yellow precipitate of diazoaminobenzene is formed. The solid is recovered by filtration and is dissolved in 45 grams of aniline containing 7.5 grams of aniline hydrochloride. This mixture is warmed to 40°–45° C. for one hour and thereafter 45 milliliters of 50 percent aqueous acetic acid is added. A yellow solid is formed which is filtered and found to be p-aminoazobenzene.

EXAMPLE 3

Organokaolins

To an aqueous suspension of 62 grams of kaolin in two liters of water was added 0.40 gram of the azobisisobutyramidine hydrochloride prepared in Example 1. The suspension was stirred, stored overnight and thereafter the solids were recovered by filtration and washed with distilled water. The solids were analyzed and found to contain 0.12 percent carbon and 0.012 percent chlorine.

In a similar experiment, the p-aminoazobenzene formed in Example 2 is dissolved in 8 volumes of methanol and to this solution is added boiling, dilute (10 percent) hydrochloric acid. The resultant solid is filtered, dissolved in water and added to an aqueous suspension of kaolin to form a p-phenylazoanilinium kaolin adduct. The adduct is readily recovered by filtration.

EXAMPLE 4

Organomontmorillonites

An aqueous solution of the azobisisobutyramidine hydrochloride was slowly added to two liters of distilled water containing 40 grams of suspended bentonite until the clay flocculated. The flocculated solid was then filtered and the filter cake was washed with several portions of distilled water. The cake was dried in air to yield a leathery appearing solid which was dispersed in methanol, filtered and dried under a nitrogen vacuum at 45° C. The solid was analyzed and found to contain 2.9 percent carbon and 1.33 percent nitrogen (Kjeldahl). The X-ray diffraction pattern revealed the organoclay solid to have a $C_o$ axis spacing of 13.7 A.

In a similar experiment, an aqueous solution of the p-aminoazobenzene in dilute hydrochloric acid is added to a second aqueous suspension of bentonite until the latter is flocculated. The resultant organoclay is purified in the manner of the preceding example.

EXAMPLE 5

Methyl methacrylate

A twenty gram portion of montmorillonite was dispersed in 800 milliliters of distilled water. Then, 0.9005 gram of azobisisobutyramidine hydrochloride was added and the resultant dispersion of organoclay was heated to 70° C. Nitrogen ceased to be evolved from the sample after 202 minutes at 70° C. Thereafter the dispersion was kept under a nitrogen atmosphere at 70° C. and 100 milliliter samples were withdrawn after 1, 23 and 95 hours. To each of the withdrawn samples was added 5 grams of methyl methacrylate. The remainder of the aqueous dispersion of free radical organoclay dispersion was stored an additional 73 hours at 70° C. and thereafter 25 grams of methyl methacrylate was added at 70° C.

Each of the mixtures of methyl methacrylate and free radical organoclay dispersions were stirred for one hour at 70° C. and the solids were separated by filtration, washed, dried and extracted with benzene to remove the polymethyl methacrylate which was not bonded to the clay.

The following table summarizes these results and also presents the results (Sample 1) from a polymerization in which the decomposition of 20 grams of azo-montmorillonite was conducted by heating to 99° C., cooling to 78° C. in 10 minutes followed by addition of 50 grams of methyl methacrylate.

TABLE 1

| Sample No. | Storage Period of free radical [1] (hours) | Polymer in insoluble solids (Wt. Percent) | Extracted Polymer (grams) |
|---|---|---|---|
| 1 | 10 minutes | 60. | 6. |
| 2 | 1 | 34.0 | 0.3402 |
| 3 | 23 | 3. | trace |
| 4 | 95 | 4.43 | none |
| 5 | 168 | 6.1 | trace |

[1] Time interval between complete azo decomposition and addition of the monomer.

In this experiment, the benzene soluble polymer was formed by initiation with completely organic isobutyramidinum chloride free radicals, whereas the benzene insoluble polymer was formed by initiation with isobutyramidinium montmorillonite to result in a polymer chain which propagated from the clay surface.

When an aqueous dispersion of methyl methacrylate is held at 70° C. for one hour, in the absence of any catalyst or initiator, no appreciable polymerization occurs. When an aqueous dispersion of the azobisisobutyramidinium montmorillonite is held at 5° C. to preclude azo decomposition, no polymerization occurs when methyl methacrylate is added.

The preceding example amply demonstrates that the organoazo-solid compositions of my invention are very effective free radical precursors which can be decomposed to yield free radicals which exist for prolonged periods without recombination. In particular, the more rapid decrease in the soluble polymer between Samples 1, 2 and 3 demonstrates the greater rate of recombination exhibited by the completely organic—and therefore more mobile—free radicals. The combined, organosolid free radicals, however, can not readily recombine and, therefore, even after one hour a substantial amount of unextractable polymer was formed.

EXAMPLE 6

*Methyl methacrylate*

To illustrate the effectiveness of an organoazo-solid as a free radical source even at room temperature, 50 grams of the kaolin adduct of azobisisobutyramidine hydrochloride, 50 grams of freshly distilled methyl methacrylate and two drops of a surfactant, Igepal CO–630 were admixed into 232 milliliters of distilled water. The mixture was stirred under a nitrogen atmosphere for 4 hours at 23.2°–24.5° C. Thereafter, the solids were filtered, washed with methanol, filtered and extracted with acetone, then soxhlet extracted with benzene for 16 hours. A total of 1.3 grams of soluble polymer was dissolved. The acetone and benzene insoluble residue was a rubbery material. The solids were pulverized in a Waring Blendor and again extracted with benzene to remove all traces of uncombined organic polymer. The solid was analyzed for carbon and the amount of polymer adducted with the clay was 2 weight percent of the solid.

When the experiment was repeated with 0.15 gram of azobisisobutyramidine hydrochloride in lieu of the 50 grams organoazo kaolin which contained 0.15 gram of combined azo compound, no polymer was formed after 4 hours at 25° C.

EXAMPLE 7

*Methyl methacrylate*

To one liter of distilled water was added 20 grams of montmorillonite and 0.5 gram of azobisisobutyramidine hydrochloride. The resultant organoclay was heated to 99° C. in 44 minutes, cooled to 78° C. in 10 minutes and then 50 grams of methyl methacrylate with two drops of Igepal CO–630 (an ethylene oxide-alkyl phenol condensate) were added. The emulsion was stirred for one hour at 77° C. and the product separated by filtration. The solid product was extracted with successive acetone and benzene washes to determine the amount of insoluble, clay-bound polymer.

The procedure was repeated; however, 50 grams of methyl methacrylate were added to the aqueous organoclay dispersion prior to heating. The results of these experiments are presented in the following table:

TABLE 2

| | Preheated | Not Preheated |
|---|---|---|
| Grams free polymer formed | 6.0 | 28.0 |
| Grams clay-bound polymer formed | 30.0 | 17.7 |
| Grams total polymer formed | 36.0 | 45.7 |
| Percent monomer converted to polymer | 72.0 | 91.4 |
| Percent monomer converted to free polymer | 12.0 | 56.0 |
| Percent monomer converted to clay-bound polymer | 60.0 | 35.4 |
| Percent free polymer in total polymer | 16.6 | 61.3 |
| Percent clay-bound polymer in total polymer | 83.3 | 38.8 |
| Percent polymer in polymer-montmorillonite | 60.0 | 47.0 |
| Ratio of free to tied polymer | 1/5 | 1/0.63 |

The benzene insoluble; and hence, clay-bonded; polymer was very hydrophobic and formed a gel in benzene. The dried solid was thermoplastic and suited for use as a molding powder.

EXAMPLE 8

*Solution polymerization*

A solution polymerization was performed by introducing 20 grams of the azobisisobutyramidinium kaolin prepared in the manner described in Example 3, 500 milliliters of N,N-dimethylformamide and 24 milliliters of methyl methacrylate into a flask. The mixture was heated to 60°–70° C. and held at this temperature for 2½ hours. Thereafter the flask contents were poured into methanol and the resultant solid phase was separated by filtration. The filter cake was extracted with benzene to remove 0.79 gram of soluble polymer. The organophilic insoluble solid was found to contain about 3.5 weight percent poly(methyl methacrylate).

EXAMPLE 9

*Bulk polymerization*

The bulk polymerization of methyl methacrylate was performed by heating a mixture of 100 grams of the monomer and 100 grams of azobisisobutyramidinium kaolin for 4 hours at 60° C. and then for 16 hours at 78° C. Solvent extraction of the resultant solids recovered 58 grams of poly(methyl methacrylate) and 84 grams of an insoluble solid which was found by carbon analysis to contain 23 weight percent of polymer.

EXAMPLE 10

*Acrylamide*

To a dispersion of 20 grams of montmorillonite was added 0.5 gram of azobisisobutyramidinium hydrochloride to form the organoclay and then 40 grams of acrylamide. The reactants were heated to 60°–70° C. while being stirred under an atmosphere of $CO_2$. After 3½ hours the dispersion was poured into methanol and the solids were recovered therefrom by filtration. Repeated water washings yielded 14 grams of a water insoluble solid which had a carbon analysis of 12.5 percent and a $C_0$ axis spacing of 15.4 A. The amount of polyacrylamide in the solid based on the carbon analysis was about 22 weight percent. The product was very hydrophilic and formed a gel in water.

EXAMPLE 11

*Vinyl acetate*

To a dispersion of 80 grams of the azobisisobutyramidinium kaolin prepared as in Example 3 in 200 milliliters of water was added 80 grams of vinyl acetate and 2 drops of Igepal CO–630. The resultant emulsion was heated under nitrogen from 25° C. to 60° C. in 41 minutes and held at 60°–63° C. for 12 minutes at which time the reaction mass became too thick to stir. The solid product was worked up to recover 15.5 grams of soluble poly(vinyl acetate) and about 80 grams of insoluble residue which, by carbon analysis, was found to contain about 6.6 weight percent clay bound polymer. The solid was organophilic.

EXAMPLE 12

Styrene

A mixture of 20 grams of azobisisobutyramidinium kaolin prepared as in Example 3, 50 milliliters of water, 24 milliliters of styrene and one drop of Igepal CO-630 was heated for one hour at 65° C. The solid (20.2 grams) was recovered by filtration and found to consist entirely of insoluble, clay-bonded, polystyrene. The content of polymer was found to be about 3 weight percent by carbon analysis. The solid was very organophilic and formed a thixotropic suspension in organic liquids. A dispersion containing 40 weight percent of the solid in Laminac 4128 polyester exhibited a Brookfield viscosity of greater than $2 \times 10^6$ centipoises at 0.3 revolution per minute of the spindle. In contrast, a 40 weight percent of kaolin in the polyester exhibited a viscosity of 70,000 centipoises.

EXAMPLE 13

Styrene and butadiene

A 750 milliliter capacity autoclave was charged with 120 milliliters of water, 50 grams of an azobisisobutyramidinium kaolin prepared as in Example 3, 16 grams of styrene, 48 grams of butadiene and 3 drops of Igepal CO-630. The contents of the autoclave were heated to 50° C. and stirred at this temperature for 24 hours. The solid product was found to comprise 0.55 grams of a rubbery polymer and 51.6 grams of an organophilic kaolin which contained 9.86 weight percent carbon. Infrared analysis indicated that the clay bonded polymer consisted of equal weights of styrene and butadiene as a copolymer. The organokaolin readily dispersed in benzene and carbon tetrachloride.

EXAMPLE 14

Acrylonitrile

A flask was charged with 150 milliliters water, 50 grams of an azobisisobutyramidinium kaolin prepared as in Example 3, 25 grams of acrylonitrile and 2 drops of Igepal CO-630. The mixture was heated while stirring to 63° C. and held at this temperature for about 40 minutes. Thereafter the mixture was poured into methanol, a solid was recovered by filtration and found to comprise 3 grams of polyacrylonitrile and 44.2 grams of an organo clay which contained 3.4 weight percent polymer bonded to the clay.

EXAMPLE 15

Acrylamide

A solution of 25 grams of acrylamide in 400 milliliters water was heated to 40° C. and purged with $CO_2$. Then, 717 grams of isopropyl alcohol and 50 grams of azobisisobutyramidinium kaolin prepared as in Example 3 were added and the temperature was raised to 68° C. in 31 minutes. After a four-hour period at 68°–70° C., the crude polymerizate was poured into methanol and the solid polymer recovered by filtration. A highly hydrophilic polyacrylamide-kaolin product was obtained which contained about 1.6 weight percent polymer. This solid had a substantially lesser settling tendency in water than untreated kaolin.

EXAMPLE 16

Chloroprene

A mixture of 80 milliliters water, 30 grams of azobisisobutyramidinium kaolin prepared as in Example 3, 3-drops of Igepal CO-630, and 50 grams of an equal volumetric mixture of xylene and chloroprene was heated to 40 C. and stirred at this temperature for 3½ hours during which an additional 10 grams of the organoclay was added. A thick creamy mass was obtained which was held at 40° C. for 15½ hours until it formed a coagulated mass. The solids were recovered by filtration and found to comprise 1.5 grams of polychloroprene and 41 grams of a hydrophobic organoclay which by carbon and chlorine analysis was found to contain about 6 weight percent kaolin bonded polychloroprene.

The preceding examples are intended solely to illustrate my invention and are not to be construed as unduly limiting thereof. My invention is intended to be defined by the following claims.

I claim:

1. The method of propagating an organic polymer from the surface of anion exchange solid possessing an ion exchange capacity of at least 0.1 milliequivalent per 100 grams which comprises reacting an organic compound having the following structure:

$$R_1-N=N-R_2$$

wherein:
at least one of said $R_1$ and $R_2$ contains a basic nitrogen group; and
$R_1$ and $R_2$ are selected from the class consisting of aryl, alkaryl, aminoaryl, amidinylaryl, aminoalkaryl, amidinylalkaryl, alkyl, amidinylalkyl, aminoalkyl, aralkyl, amidinylaralky, and aminoaraky;
with said ion exchange solid to bond said organic compound to said ion exchange solid through said basic nitrogen group, decomposing said azo radical by homolytic fission to obtain a free radical fragment which is bonded to said ion exchange solid through said basic nitrogen group and which has a terminal carbon with an unshared electron in its valence shell and polymerizing an ethylenically unsaturated monomer by contacting said ethylenically unsaturated monomer with said free radical under polymerization conditions to therby propagate said organic polymer from the surface of said ion exchange surface.

2. The method of claim 1 wherein the decomposition of said azo radical and the polymerization of said ethylenically unsaturated monomer is performed in an aqueous medium.

3. The method of claim 1 wherein the decomposition of said azo radical and the polymerization of said ethylenically unsaturated monomer is performed in a solvent for said monomer.

4. The method of claim 1 wherein the reaction product comprising said organic compound bonded to said ion exchange solid is added to said ethylenically unsaturated monomer and decomposed therein.

5. The method of claim 1 wherein said ion-exchange solid is an alumino-silicate.

6. The method of claim 5 wherein said alumino-silicate is clay.

7. The method of propagating a polymer chain from the surface of an expanding lattice clay which comprises reacting said clay with an organic compound having the following structure:

$$R_1-N=N-R_2$$

wherein:
at least one of said $R_1$ and $R_2$ contains a basic nitrogen group; and
$R_1$ and $R_2$ are selected from the class consisting of aryl, alkaryl, aminoaryl, amidinylaryl, aminoalkaryl, amidinylalkaryl, alkyl, amidinylalkyl, aminoalkyl, aralkyl, amidinylaralky, and aminoaralkyl;
to bond said organic compound to said clay through said basic nitrogen groups, decomposing said azo radical by homolytic fission of the nitrogen to carbon bonds to obtain a resultant mixture comprising free radicals which are bonded to said clay through said basic nitrogen groups and which have terminal carbons which, in their valence shell, have an unshared electron as well as some entirely organic free radicals which are not bonded to said clay, holding said resultant mixture for a period of time greater than about 3 minutes to permit said entirely organic free radicals to recombine and thereafter polymerizing an ethylenically unsaturated monomer by contacting said ethylenically unsaturated monomer with said resultant mixture under polymerization conditions to initiate said polymerization and thereby propagate said polymer chain from said free radical.

8. The method of claim 7 wherein said clay is montmorillonite.

9. The method of claim 8 wherein said monomer is methyl methacrylate.

10. A composition comprising an ion exchange solid having a base exchange capacity of at least about 0.1 milliequivalent per 100 grams and an organic polymer chain of an ethylenically unsaturated monomer having a single basic nitrogen onium group per polymer chain, said basic nitrogen onium group being terminally positioned on said polymer chain; and said organic polymer chain being chemically bonded to said ion exchange solid through said basic nitrogen onium group.

11. The composition of claim 10 wherein said ion exchange solid comprises an inorganic metal oxide.

12. The composition of claim 11 wherein said inorganic metal oxide comprises an alumino silicate.

References Cited by the Examiner

UNITED STATES PATENTS 2,520,339    8/50    Robertson    260—89.5
2,951,087    8/60    Hauser et al.    260—94.2

OTHER REFERENCES

Watt et al.: Clays and Clay Minerals, 9, copyright July 6, 1962, Pergamon Press Ltd., New York, pp. 568–584.

Komada: Chem Abs, 41 (1947), p, 3743a.

JOSEPH L. SCHOFER, *Primary Examiner.*
DONALD E. CZAJA, *Examiner.*

UNITED STATES PATENT OFFICE
CERTIFICATE OF CORRECTION

Patent No. 3,208,984 September 28, 1965

Henri G. G. Dekking

It is hereby certified that error appears in the above numbered patent requiring correction and that the said Letters Patent should read as corrected below.

Column 12, line 11, for "anion" read -- an ion --; line 23, for "aminoaraky" read -- aminoaralkyl --; same column 12, line 64, for "amidinylaralky" read -- amidinylaralkyl --.

Signed and sealed this 31st day of May 1966.

(SEAL)
Attest:

NEST W. SWIDER
Attesting Officer

EDWARD J. BRENNER
Commissioner of Patents